United States Patent
Haynes et al.

(10) Patent No.: US 12,459,656 B2
(45) Date of Patent: Nov. 4, 2025

(54) REGULATOR WITH ORIENTATION VALVE

(71) Applicant: GOODRICH CORPORATION, Charlotte, NC (US)

(72) Inventors: Timothy Haynes, Prescott Valley, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 871 days.

(21) Appl. No.: 17/715,805

(22) Filed: Apr. 7, 2022

(65) Prior Publication Data
US 2022/0234743 A1   Jul. 28, 2022

Related U.S. Application Data

(62) Division of application No. 16/409,362, filed on May 10, 2019, now Pat. No. 11,299,282.

(51) Int. Cl.
| | |
|---|---|
| *B64D 25/14* | (2006.01) |
| *F16K 17/36* | (2006.01) |
| *A62B 1/20* | (2006.01) |
| *B63C 9/04* | (2006.01) |

(52) U.S. Cl.
CPC .......... *B64D 25/14* (2013.01); *F16K 17/366* (2013.01); *A62B 1/20* (2013.01); *B63C 9/04* (2013.01); *B63C 2009/042* (2013.01)

(58) Field of Classification Search
CPC .............. B64D 25/14; F16K 17/366
See application file for complete search history.

(56) References Cited

U.S. PATENT DOCUMENTS

| | | | |
|---|---|---|---|
| 3,463,287 A * | 8/1969 | Smith | B64D 25/14 193/25 B |
| 4,417,861 A | 11/1983 | Tolbert | |
| 5,036,846 A | 8/1991 | Aulgur | |

(Continued)

FOREIGN PATENT DOCUMENTS

| | | |
|---|---|---|
| EP | 2154062 | 2/2010 |

OTHER PUBLICATIONS

USPTO, Restriction/Election Requirement dated May 19, 2021 in U.S. Appl. No. 16/409,362.

(Continued)

*Primary Examiner* — Tye William Abell
(74) *Attorney, Agent, or Firm* — SNELL & WILMER L.L.P.

(57) ABSTRACT

An orientation valve, in accordance with various embodiments, is disclosed herein. The orientation valve may comprise a first coupling portion, an insert portion, a second coupling portion, an internal cavity, and a piston. The insert portion may have a first inlet aperture and a second inlet aperture. The second coupling portion may be disposed between the first coupling portion and the insert portion. The internal cavity may be coupled to the first inlet aperture and the second inlet aperture. The piston may be disposed within the internal cavity. The orientation valve may be configured to block fluid flow from a compressed fluid source when an evacuation system is in a stored position. The orientation valve may be configured to fluidly couple the compressed fluid source and the evacuation device when the evacuation system is in a deployed position.

6 Claims, 7 Drawing Sheets

(56) References Cited

U.S. PATENT DOCUMENTS

| | | | |
|---|---|---|---|
| 8,382,541 B1* | 2/2013 | Campbell | B63C 9/04 |
| | | | 441/40 |
| 2004/0094671 A1* | 5/2004 | Moro | B64D 25/14 |
| | | | 244/137.2 |
| 2016/0107733 A1* | 4/2016 | Thomson | F04D 29/4206 |
| | | | 417/53 |
| 2017/0203849 A1* | 7/2017 | John | B64D 25/14 |
| 2019/0054987 A1* | 2/2019 | Haynes | B63B 43/06 |
| 2020/0018407 A1* | 1/2020 | Molfa | F16K 17/403 |

OTHER PUBLICATIONS

USPTO, Preinterview First Office Action dated Sep. 8, 2021 in U.S. Appl. No. 16/409,362.
USPTO, Notice of Allowance dated Dec. 14, 2021 in U.S. Appl. No. 16/409,362.

* cited by examiner

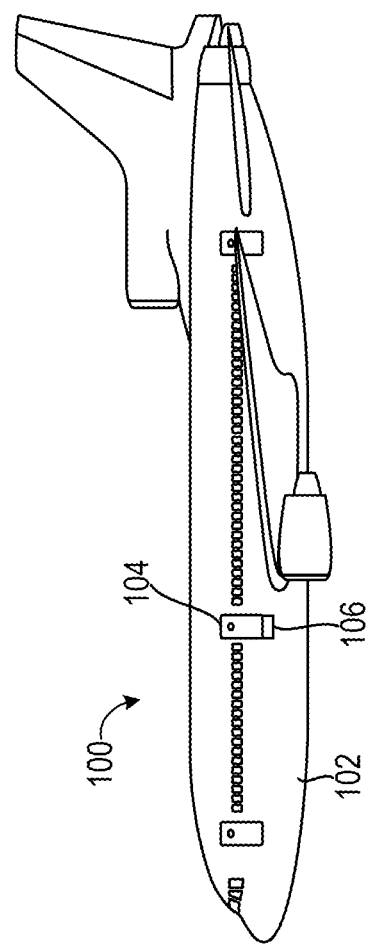

REGULATOR WITH ORIENTATION VALVE

CROSS-REFERENCE TO RELATED APPLICATIONS

This application is a divisional of, and claims priority to, and the benefit of Non-Provisional application Ser. No. 16/409,362, filed May 10, 2019 for REGULATOR WITH ORIENTATION VALVE, which is incorporated in its entirety by reference herein for all purposes.

FIELD

The present disclosure relates to emergency evacuations systems for vehicles such as aircraft, and more particularly, to the inflation of an emergency evacuation slide.

BACKGROUND

In the event of an aircraft evacuation, evacuation systems, which may comprise an evacuation slide, are often deployed to safely usher passengers from the aircraft to the ground. In response to being deployed, compressed fluid is routed from a pressure regulator to an evacuation device to inflate the evacuation device. Typically, a hose is coupled to a port of the evacuation slide allowing fluid to flow freely upon activation of the evacuation system.

SUMMARY

An orientation valve, in accordance with various embodiments, is disclosed herein. The orientation valve may comprise a first coupling portion, an insert portion, a second coupling portion, an internal cavity, and a piston. The insert portion may have a first inlet aperture and a second inlet aperture. The second coupling portion may be disposed between the first coupling portion and the insert portion. The internal cavity may be coupled to the first inlet aperture and the second inlet aperture. The piston may be disposed within the internal cavity.

In various embodiments, the piston comprises a first circumferential groove disposed at a first end of the piston. The orientation valve may further comprise an O-ring disposed within the first circumferential groove. The internal cavity may comprise a second circumferential groove disposed proximate the first inlet aperture, the O-ring being configured to create a seal between the second circumferential groove and the first circumferential groove when the orientation valve is in an inverted and closed position. The piston may be configured to block the first inlet aperture and the second inlet aperture when the orientation valve is in an upright and closed position. The piston may be configured to fluidly couple the first inlet aperture and the second inlet aperture to the internal cavity when the orientation valve is in an inverted and open position. The orientation valve may further comprise a hexagonal head disposed between the first coupling portion and the second coupling portion.

An evacuation system, in accordance with various embodiments, is disclosed herein. The evacuation device may comprise a pressure regulator, an orientation valve, a hose assembly, a compressed fluid source, and an evacuation device. The pressure regulator may have an inlet port. The orientation valve may have a first coupling portion and an insert portion, the orientation valve being disposed within the inlet port of the pressure regulator. The hose assembly may have a hose coupling portion, the hose coupling portion being coupled to the first coupling portion, the insert portion being disposed within the hose assembly. The compressed fluid source may be coupled to the hose assembly. The evacuation device may be coupled to the pressure regulator.

The orientation valve may be configured to block fluid flow from the compressed fluid source when the evacuation system is in a stored position. The orientation valve may be configured to fluidly couple the compressed fluid source and the evacuation device when the evacuation system is in a deployed position.

In various embodiments, the insert portion may comprise a first inlet aperture and a second inlet aperture. The orientation valve may further comprise an internal cavity and a piston, the internal cavity being coupled to the first inlet aperture and the second inlet aperture, and the piston being configured to block the fluid flow when the evacuation system is in the stored position. The orientation valve may further comprise an O-ring coupled to the piston, the O-ring being configured to create a seal between the piston and the internal cavity when the evacuation system is in the stored position. The piston may comprise a first circumferential groove disposed at a first end of the piston, the O-ring being disposed within the first circumferential groove. The internal cavity may comprise a second circumferential groove disposed proximate the first inlet aperture. The O-ring may be configured to create the seal between the second circumferential groove and the first circumferential groove when the evacuation system is in the stored position. The orientation valve may be in an upright and closed position when the evacuation system is in the stored position. The orientation valve may be in an inverted and open position when the evacuation system is in the deployed position.

A method of operation of an evacuation system, in accordance with various embodiments, is disclosed herein. The method may comprise activating a firing cable while the evacuation system is in a stored position; supplying a fluid through a hose assembly to an orientation valve in response to the firing cable being activated; and blocking, by the orientation valve being in a closed position, the fluid from inflating an evacuation device of the evacuation system.

In various embodiments, the method may further comprise deploying the evacuation system external to a fuselage of an aircraft; and supplying, by the orientation valve being in an open position, the fluid to the evacuation device. The orientation valve may be in an upright position when it is in a closed position. The method may further comprise inflating the evacuation device. The orientation valve may comprise an internal cavity and a piston, the piston being configured to block the fluid from inflating the evacuation device when the orientation valve is in a closed position. The orientation valve may further comprise an O-ring coupled to the piston. The blocking the fluid may further comprise the O-ring creating a seal between a first circumferential groove in the internal cavity and a second circumferential groove in the piston. The method may further comprise inverting the orientation valve from the closed position to the open position prior to suppling the fluid to the evacuation device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 1A illustrates a side view of an aircraft, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Referring to FIG. 1A, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 1B:
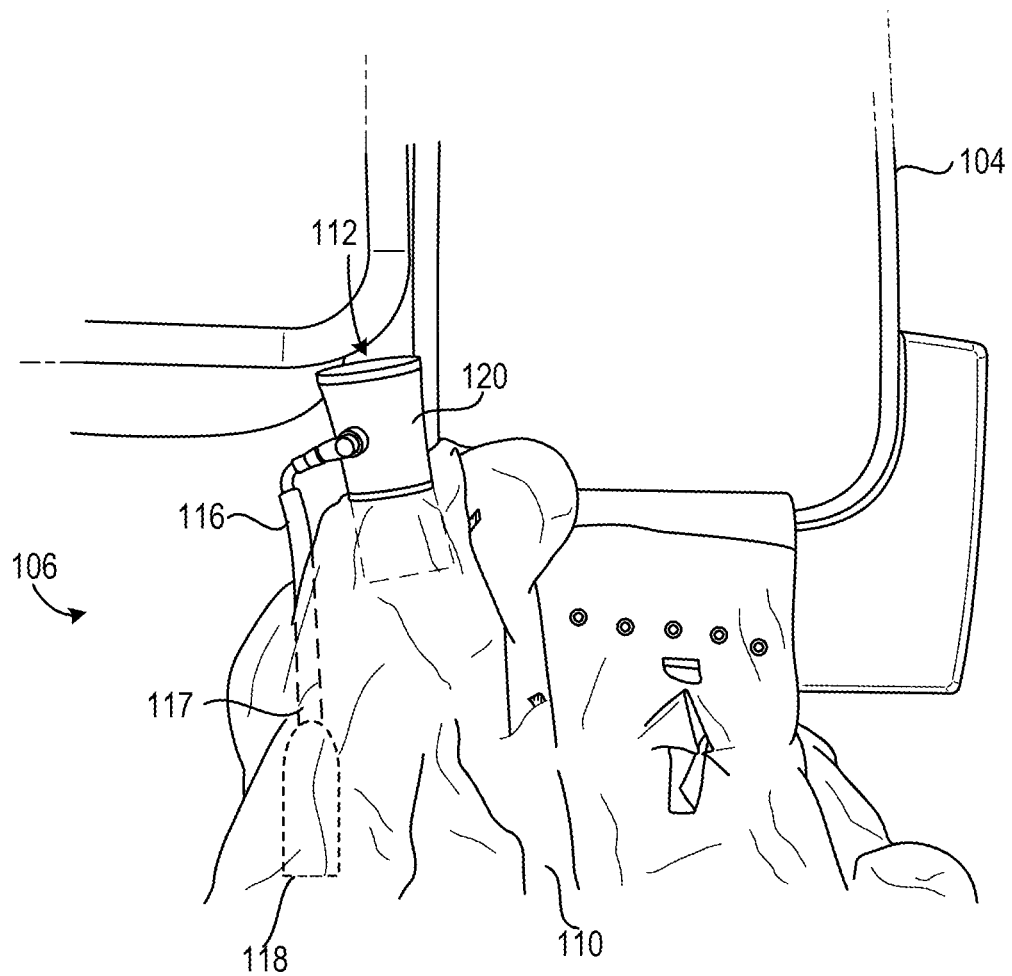
FIG. 1B illustrates a perspective view of an aircraft having an evacuation system, in accordance with various embodiments.

Referring to FIGS. 1A and 1B, additional details of evacuation system 106 are illustrated, in accordance with various embodiments. In particular, evacuation system 106 includes an inflatable evacuation device 110. Inflatable evacuation device 110 may be a slide, a slide raft, a life raft, a floatation device or other evacuation device, which may be inflatable. Evacuation system 106 further includes a source of pressure regulated fluid 112. The pressure regulated fluid 112 may enter the inflatable evacuation device 110 to inflate the inflatable evacuation device 110. The inflatable evacuation device 110 may be coupled to the fuselage 102 of FIG. 1 and may be decoupled from fuselage 102 in response to being fully inflated or manually detached to allow passengers and/or crew members to safely float away from aircraft 100 of FIG. 1A.

In various embodiments, the source of pressure regulated fluid 112 may include pressure regulator 120 coupled to the inflatable evacuation device 110, piping 116 coupled to the pressure regulator 120, and a compressed fluid source 118 coupled to the piping 116. In various embodiments the pressure regulator 120 may be coupled directly to the compressed fluid source 118 or may be integral to the compressed fluid source 118. During normal flight conditions, inflatable evacuation device 110 may be deflated and stored within a compartment of aircraft 100. In various embodiments, inflatable evacuation device 110 and pressure regulator 120 may be stored in a single package within the aircraft compartment. In response to deployment of evacuation system 106, a valve 117 may open and fluid may flow from compressed fluid source 118 into pressure regulator 120 via piping 116 at a relatively high pressure. This fluid flow may cause pressure regulator 120 to reduce the relatively high pressure fluid to a relatively lower pressure, i.e. a regulated pressure ($P_{reg}$). The fluid flow (such as the flow of a gas) may be directed into the inflatable evacuation device 110 at the relatively lower pressure. In response to receiving the fluid flow, inflatable evacuation device 110 may begin to inflate.

Figure 2A:
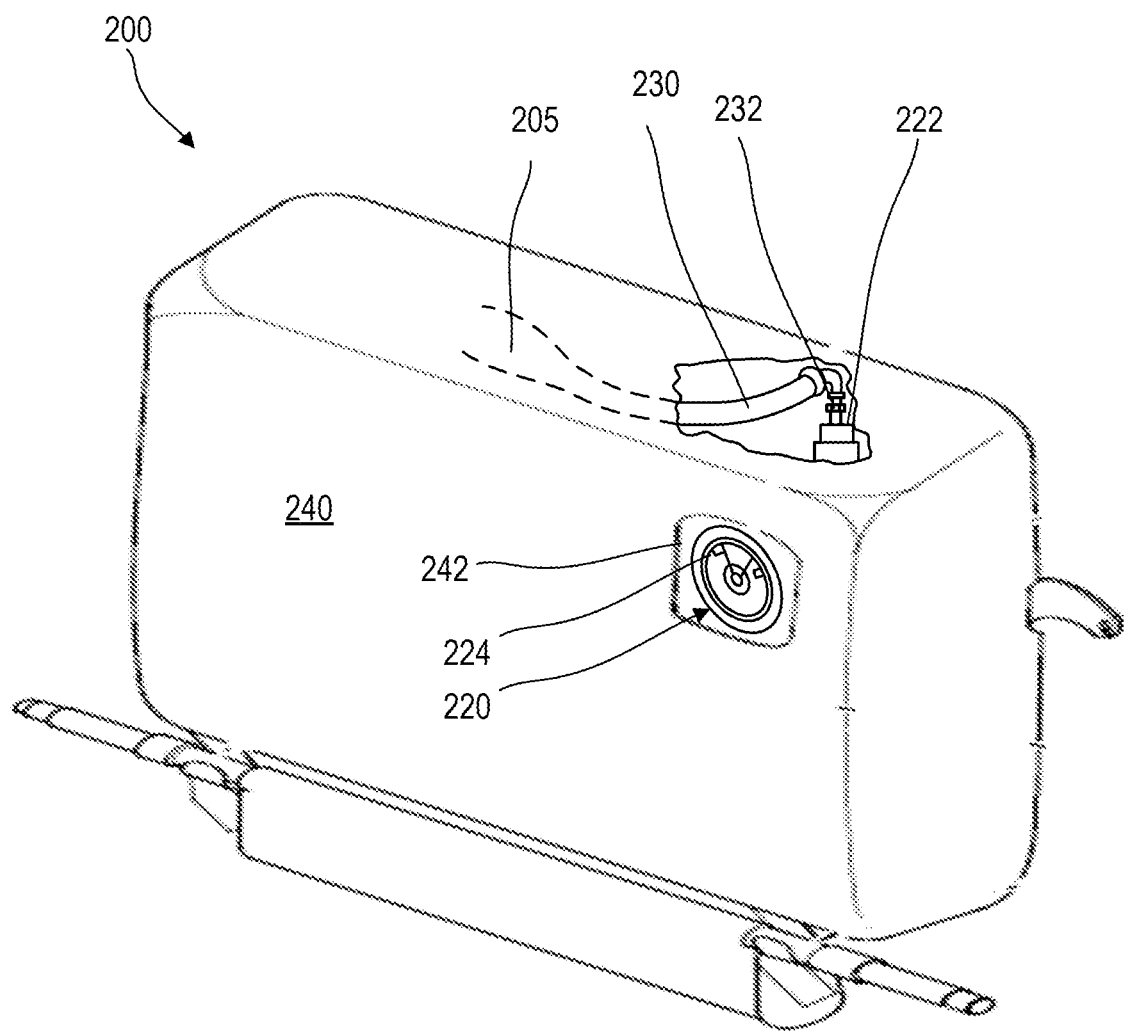
FIG. 2A illustrates a perspective view of an evacuation system, in accordance with various embodiments.

Referring now to FIG. 2A, an evacuation system 200 in a stored position, in accordance with various embodiments, is depicted. The evacuation system 200 comprises a housing 240, a pressure regulator 220, and a hose assembly 230. With brief reference to FIG. 3A, the evacuation system 200 may comprise an evacuation device 210 stored within the housing 240 and not shown in FIG. 2A. The pressure regulator 220 may comprise an inlet port 222 and a regulator gauge 224. Housing 240 may comprise a housing window 242. In various embodiments, the evacuation system 200 is coupled to the fuselage of an aircraft. In various embodiments, the hose assembly 230 is coupled to the pressure regulator 220 at the inlet port 222. At an opposite end of the hose assembly 230, the hose assembly 230 may be coupled to a compressed fluid source 205. In a stored position, the pressure regulator 220 and hose assembly 230 may be oriented in a first orientation. The first orientation may have the hose coupling 232 oriented vertical with respect to the inlet port 222. In various embodiments, oriented vertical is defined as being higher than another component in reference to a ground plane (X-Y plane).

The housing window 242 may be configured to allow a person to check the regulator gauge 224 from inside the cabin of an aircraft. Additionally, the housing 240 may ensure that the pressure regulator 220 and the hose assembly 230 remain in the first orientation while the evacuation device is in a stored position. Upon deployment of the evacuation device, the compressed fluid source 205 fluidly communicates with the pressure regulator 220 via the hose assembly 230 and inflates the evacuation device of the evacuation system. The evacuation system 200 may be configured to have the pressure regulator 220 and the hose assembly 230 oriented in a second orientation during deployment of the evacuation device.

Figure 2B:
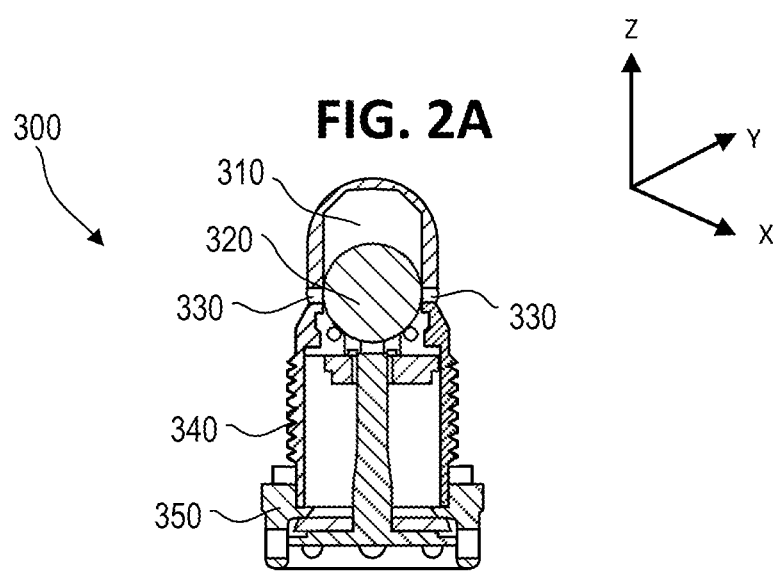
FIG. 2B illustrates a cross-section of an orientation valve in an inverted and closed position for use in an evacuation system, in accordance with various embodiments.

In various embodiments, the compressed fluid source 205 is coupled to a firing cable to activate the operation of the evacuation system 200 and inflate the evacuation device 210. Referring now to FIGS. 2A and 2B, an orientation valve 300 may be disposed between the inlet port 222 and the house coupling 232. The orientation valve 300 may be in a closed position when the evacuation system 200 is in a stored position. The orientation valve 300 may comprise an internal cavity 310 and a ball bearing 320 disposed within the internal cavity 310. The orientation valve 300 may further comprise at least two inlet apertures 330. In a closed position, the at least two inlet apertures 330 may be blocked by the ball bearing 320.

In various embodiments, the orientation valve 300 may further comprise a first coupling portion 340 and a second coupling portion 350. First coupling portion 340 may be threaded. First coupling portion 340 may be configured to mate with hose coupling 232. In various embodiments, hose coupling 232 may be threadingly coupled to first coupling portion 340 and fluidly connected to the at least two inlet apertures 330. In various embodiments, second coupling portion 350 may be threaded. Second coupling portion 350 may be coupled to inlet port 222 of pressure regulator 220. Second coupling portion 350 and inlet port 222 may be coupled by any method known in the art. In various embodiments, the second coupling portion 350 and inlet port 222 are threadingly coupled. In various embodiments, the second coupling portion 350 and inlet port 222 are press fit together.

In various embodiments, the orientation valve 300 may be manufactured from a stainless steel alloy, a nickel alloy, a titanium alloy, or any other material commonly known in the art. The orientation valve 300 may be additively manufactured, machined, or manufactured by any other method commonly known in the art.

When the evacuation device of the evacuation system 200 is stored in housing 240, the orientation valve 300 may be in an inverted position and a closed position, as depicted in FIG. 2B. If the firing cable is accidently pulled, and/or if the compressed fluid source 205 is accidently initiated when the evacuation system 200 is in a stored position, the orientation valve 300 is configured to block the flow from the hose assembly 230 to the pressure regulator 220. The orientation valve 300 may be configured to prevent an in cabin deployment of the evacuation device by preventing fluid communication between the compressed fluid source 205 and the evacuation device.

Figure 3A:
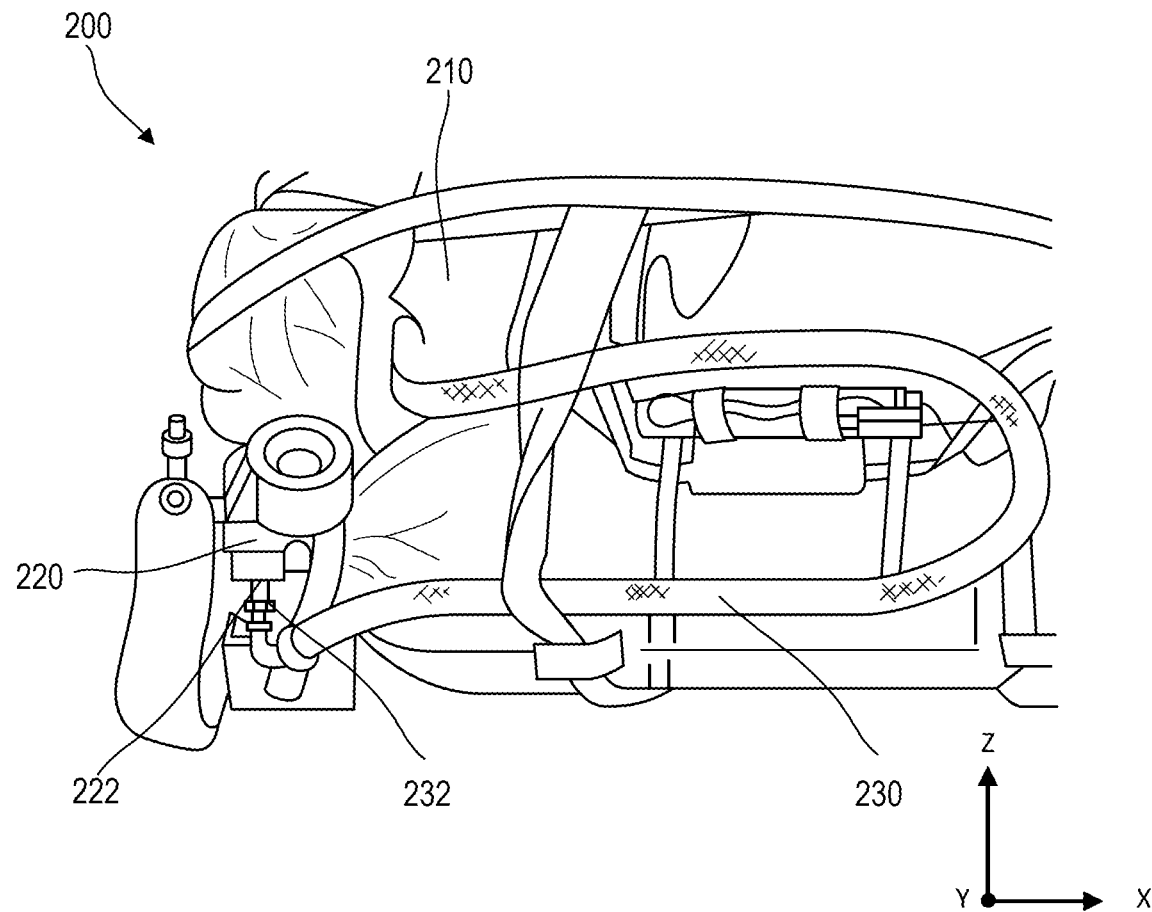
FIG. 3A illustrates a perspective view of an evacuation system, in accordance with various embodiments.

Referring now to FIG. 3A, an evacuation system 200 during deployment of the evacuation device 210, in accordance with various embodiments, is depicted. In particular, evacuation system 200 includes an inflatable evacuation device 210, the pressure regulator 220, and the hose assembly 230. In various embodiments, the inflatable evacuation device 210 is stored in a deflated compact state within a housing 240, as shown in FIG. 2A. In a deployed position, the pressure regulator 220 and hose assembly 230 may be oriented in the second orientation. The second orientation may have the inlet port 222 of the pressure regulator 220 vertical to the hose coupling 232. As used in this context, vertical is defined as being displaced in the positive z direction relative to a ground plane (X-Y plane). In various embodiments, the second orientation is opposite to the first orientation.

Figure 3B:
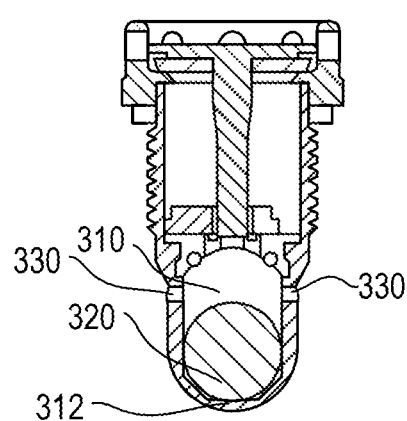
FIG. 3B illustrates a cross-section of an orientation valve in an inverted and closed position for use in an evacuation system, in accordance with various embodiments.

Referring now to FIGS. 3A and 3B, an orientation valve 300 may be disposed between inlet port 222 of pressure regulator 220 and coupling portion 232 of hose assembly 230. In a deployed position, orientation valve 300 may be in an upright position and/or an open position, as depicted in FIG. 3B. In an upright position, orientation valve 300 may be configured to allow ball bearing 320 to drop via gravity to a first end 312 of internal cavity 310. When ball bearing 320 is disposed at first end 312 of internal cavity 310, the at least two inlet apertures 330 may be in fluid communication with internal cavity 310. In an open position, pressure regulator 220 and hose assembly 230 may be fluidly coupled through the orientation valve 300 at the at least two inlet apertures 330. In various embodiments, in a deployed position, the compressed fluid source 205 may be configured to supply fluid through hose assembly 230 through the orientation valve 300 into the pressure regulator 220 and inflate the evacuation device 210.

Figure 4:
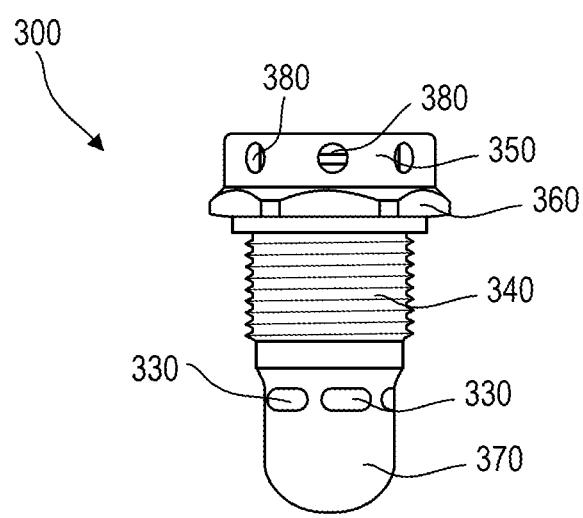
FIG. 4 illustrates a side view of an orientation valve for use in an evacuation system, in accordance with various embodiments.

Referring now to FIG. 4, an orientation valve 300, in accordance with various embodiments, is depicted. Orientation valve 300 may comprise a first coupling portion 340, a second coupling portion 350, a hexagonal head 360, an insert portion 370, at least two inlet apertures 330, and at least two outlet apertures 380. The hexagonal head may be disposed between the first coupling portion 340 and the second coupling portion 350. The insert portion 370 may comprise at least two inlet apertures 330. The insert portion 370 may be disposed adjacent to the first coupling portion 340. The first coupling portion 340 may comprise a male thread coupling portion.

In various embodiments, the hexagonal head 360 may be configured to receive a tool to torque the second coupling portion 350 into an inlet port of a regulator. The hexagonal head 360 may provide a counter torque to installing a coupling portion of a house assembly on first coupling portion 340. With brief reference to FIG. 3A, the counter torque may ensure that the orientation valve 300 remains in the inlet port 222 of the pressure regulator 220 during installation of the hose assembly 230. In various embodiments, the diameter of the insert portion 370 is less than the diameter of the first coupling portion 340. This may ensure that a mating hose assembly may be fluidly coupled to the at least two inlet apertures 330 of the orientation valve.

Figure 5A:
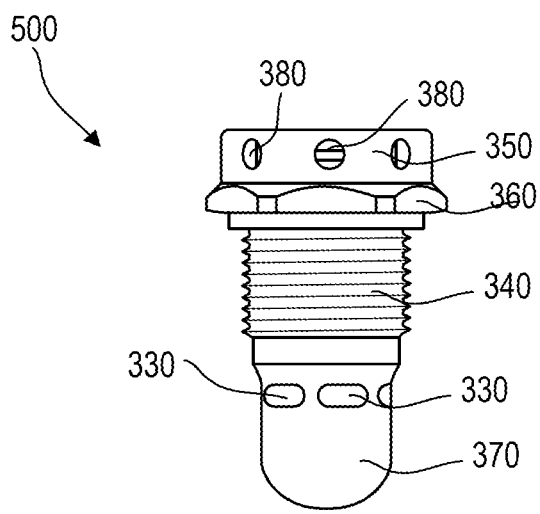
FIG. 5A illustrates a side view of an orientation valve for use in an evacuation system, in accordance with various embodiments.
Figure 5B:
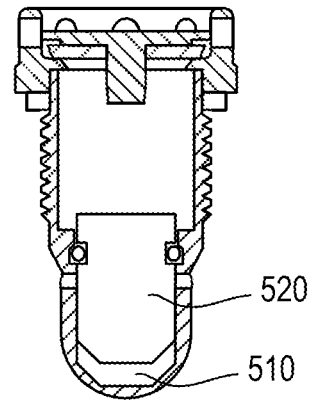
FIG. 5B illustrates a cross-section of an orientation valve in an upright and closed position for use in an evacuation system, in accordance with various embodiments.
Figure 5C:
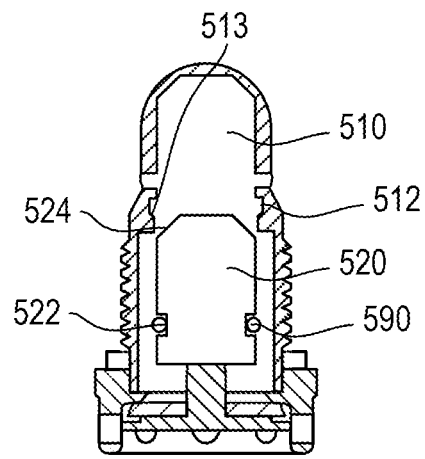
FIG. 5C illustrates a cross-section of an orientation valve in an inverted and open position for use in an evacuation system, in accordance with various embodiments.

With reference now to FIGS. 5A-5C, an orientation valve 500, in accordance with various embodiments, is depicted. Orientation valve 500 comprises a first coupling portion 340, a second coupling portion 350, a hexagonal head 360, an insert portion 370, at least two inlet apertures 330, and at least two outlet apertures 380. Orientation valve 500 may further comprise an internal cavity 510, a piston 520, and an O-ring 590. The piston 520 may be disposed within internal cavity 510. Piston 520 may comprise a circumferential groove 522 disposed at a first end of piston 520. The piston 520 may further comprise a chamfer portion 524 at a second end of the piston 520. In various embodiments, O-ring 590 is disposed within the circumferential groove 522 of the piston 520. In various embodiments, the internal cavity 510 comprises a circumferential groove 512.

Circumferential groove 512 may be configured to receive O-ring 590 when the orientation valve 500 is in a closed position, as shown in FIG. 5B. In a closed position, piston 520 may block the at least two inlet apertures 330 of the insert portion 370.

In various embodiments, the chamfer portion 524 of piston 520 may be configured to keep piston 520 aligned in the internal cavity 510. In various embodiments, O-ring 590 may be configured to create a seal between circumferential groove 512 of internal cavity 510 and circumferential groove 522 of piston 520 when the orientation valve 500 is in an upright position and/or a closed position, as shown in FIG. 5B. This may ensure that fluid may not be communicated past O-ring 590 when orientation valve 500 is in a closed position. The piston 520 and O-ring 590 may slidabley engage circumferential groove 512 of internal cavity 510. Circumferential groove 512 may comprise a chamfer 513 on a first end of the circumferential groove. The chamfer 513 may allow piston 520 and O-ring 590 to more easily engage circumferential groove 512 when changing from an inverted position to an upright position or vice versa. With reference now to FIGS. 5A and 2A, first coupling portion 340 may be configured to mate with inlet port 222 of pressure regulator 220. Similarly, second coupling portion 350 may be configured to mate with coupling portion 232 of hose assembly 230. In various embodiments, piston 520 may be reversed, such that the orientation valve is in an open position when it is upright and in a closed position when it is in an inverted position.

Figure 6:
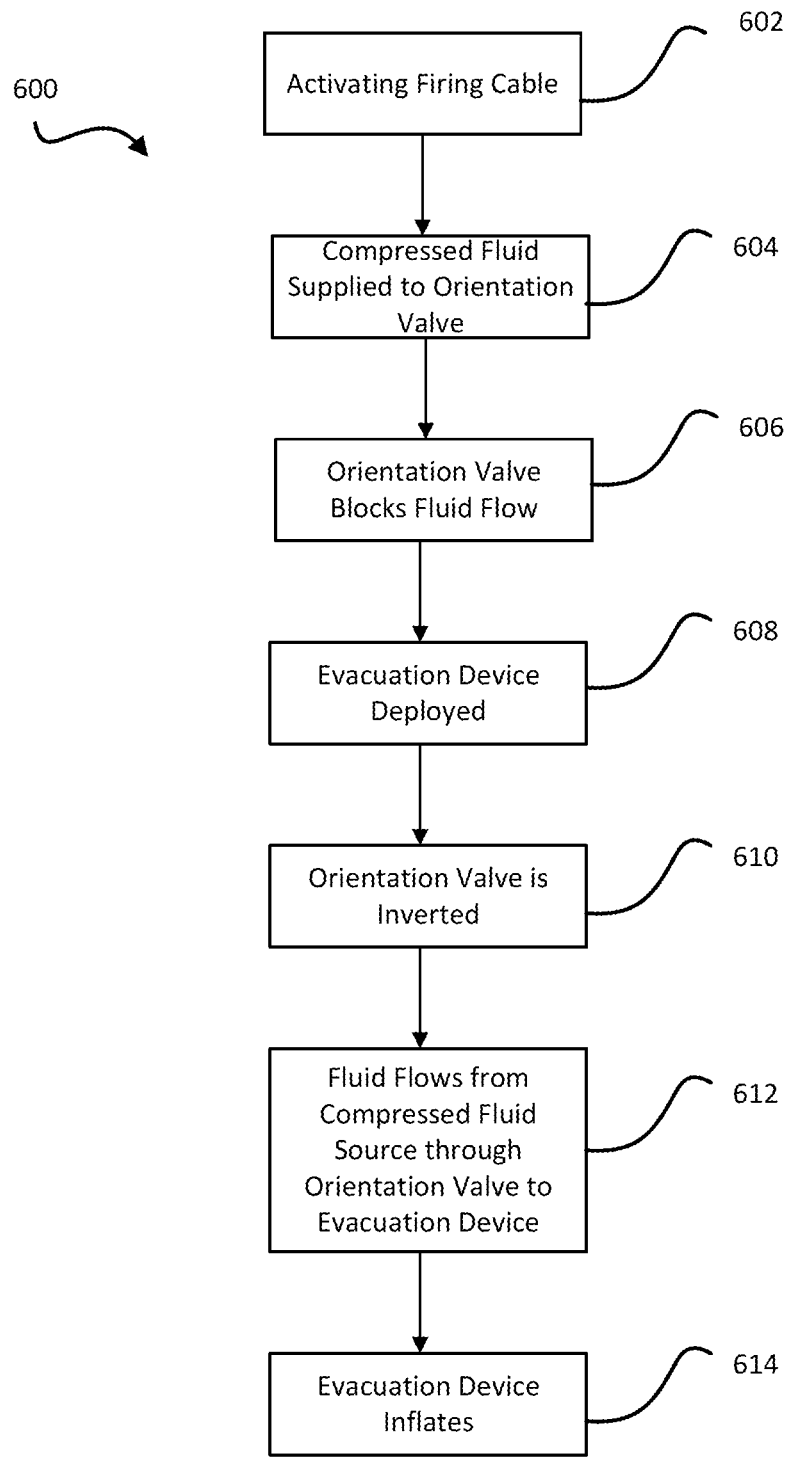
FIG. 6 illustrates a method of operation for an evacuation system, in accordance with various embodiments.

With reference now to FIG. 6, a method of operation of an evacuation system 600, in accordance with various embodiments, is depicted. The method may comprise a firing cable of an evacuation system being activated while the evacuation system is in a stored position (step 602). Upon the firing cable being activated, a compressed fluid may be supplied from a compressed fluid source through a hose assembly to an orientation valve (step 604). The orientation valve may be in an upright position and a closed position. In various embodiments, the orientation valve may be in an inverted position and closed position. By being in a closed position, orientation valve may block the fluid being supplied by the compressed fluid source from flowing past the orientation valve and into a pressure regulator (step 606). The orientation valve may ensure that the evacuation device remains deflated while it is in a stored position. An evacuation device may then be deployed and released external to a fuselage (step 608). Upon deployment, the orientation valve may be inverted from its upright position and closed position to an inverted position and open position (step 610). In various embodiments, upon deployment, the orientation valve may be inverted from its inverted position and closed position to an upright position and open position. As it is being deployed, orientation valve changes orientation between 160 degrees and 200 degrees from a closed position to an open position. By being in an open position, orientation valve fluidly couples the compressed fluid source to the evacuation device and allows fluid to flow from the compressed fluid source through the orientation valve and on to the evacuation device (step 612). Then, the evacuation device inflates from the fluid being communicated from the compressed fluid source to the evacuation device (step 614).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operation of an evacuation system, the method comprising:
   activating a firing cable while the evacuation system is in a stored position;
   supplying a fluid through a hose assembly to an orientation valve in response to the firing cable being activated; and
   blocking, by the orientation valve being in a closed position, the fluid from inflating an evacuation device of the evacuation system, wherein the orientation valve comprises an internal cavity and a piston, the piston being configured to block the fluid from inflating the evacuation device when the orientation valve is in the closed position.

2. The method of claim 1, wherein the orientation valve is in an upright position when it is in the closed position.

3. The method of claim 1, wherein the orientation valve further comprises an O-ring coupled to the piston, and wherein the blocking the fluid further comprises the O-ring creating a seal between a first circumferential groove in the internal cavity and a second circumferential groove in the piston.

4. The method of claim 1, further comprising:
   deploying the evacuation system external to a fuselage of an aircraft; and
   supplying, by the orientation valve being in an open position, the fluid to the evacuation device.

5. The method of claim 4, further comprising inflating the evacuation device.

6. The method of claim 4, further comprising inverting the orientation valve from the closed position to the open position prior to supplying the fluid to the evacuation device.

* * * * *